United States Patent
Chu

(10) Patent No.: US 9,244,929 B2
(45) Date of Patent: Jan. 26, 2016

(54) AUTOMATED INDEXING OF ELECTRONIC FILES AND FILE FOLDERS

(75) Inventor: Shiqiang Chu, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1424 days.

(21) Appl. No.: 11/931,546

(22) Filed: Oct. 31, 2007

(65) Prior Publication Data

US 2009/0112911 A1 Apr. 30, 2009

(51) Int. Cl.
*G06F 17/30* (2006.01)

(52) U.S. Cl.
CPC .................... *G06F 17/30097* (2013.01)

(58) Field of Classification Search
USPC ......... 707/200, 102, 100, 204, 698, 711, 741, 707/781, 758; 725/25, 86
See application file for complete search history.

(56) References Cited

U.S. PATENT DOCUMENTS

| | | | | |
|---|---|---|---|---|
| 6,374,266 | B1 * | 4/2002 | Shnelvar | 707/204 |
| 7,231,516 | B1 * | 6/2007 | Sparrell et al. | 713/156 |
| 7,401,080 | B2 * | 7/2008 | Benton | G06F 17/30097 707/692 |
| 7,627,609 | B1 * | 12/2009 | Ozekinci et al. | 707/200 |
| 2001/0042204 | A1 * | 11/2001 | Blaker et al. | 713/165 |
| 2002/0107877 | A1 * | 8/2002 | Whiting et al. | 707/204 |
| 2003/0044170 | A1 * | 3/2003 | Haddad et al. | 386/124 |
| 2003/0182310 | A1 * | 9/2003 | Charnock et al. | 707/104.1 |
| 2006/0294115 | A1 * | 12/2006 | Armangau et al. | 707/100 |

OTHER PUBLICATIONS

Sems, Marty, "Add Video to a Word or WordPerfect Document" Jan. 2001, www.smartcomputing.com <http://www.smartcomputing.com/Editorial/article.asp?article=articles/archive/l0701/45l01/45l01.asp&guid=> p. 1-4.*
Jpbowen, "Header (computing)" Oct. 3, 2007, www.wikipedia.org <http://en.wikipedia.org/w/index.php?title=Header_(computing)&oldid=161909100>, p. 1.*
206.202.64.46, "Hash Table" Oct. 30, 2007, Wikepedia.org <http://en.wikipedia.org/w/index.php?title=Hash_table&oldid=167985609#Open_addressing> p. 1-10.*
Holte, "Lecture 11—Open Addressing" May 7, 2003, xu.edu, pp. 1 of 1 and 1-4 of 4.*

* cited by examiner

*Primary Examiner* — Amresh Singh
(74) *Attorney, Agent, or Firm* — Ingrassia Fisher & Lorenz, P.C.

(57) ABSTRACT

A method for indexing an electronic file is presented. In the method, a first value based upon a time value is generated. An index for the electronic file is generated, with the index including the first value and a second value. The electronic file is associated with the index. In another embodiment, an electronic system includes a memory configured to store an electronic file, and control logic located within an electronic device of the electronic system and coupled with the memory. The control logic is configured to generate a first value comprising a timestamp, and to produce an index associated with the electronic file, wherein the index comprises the first value and a second value.

19 Claims, 4 Drawing Sheets

AUTOMATED INDEXING OF ELECTRONIC FILES AND FILE FOLDERS

BACKGROUND

Some electronic systems, such as computer systems and similar processor-based equipment, may produce or store electronic files on an ongoing basis. Typically, these files are "indexed," such as by way of a file name or other information distinguishing the file from others. Thus, a particular file may then be retrieved by using its unique index, such as a file name, to identify and locate the file. While some computers and similar systems often rely on a user to supply the index or file name for each file generated as a result of the actions of the user, other files may be generated automatically upon normal operation of the system, making the naming of the files by a user unrealistic. In other cases, even if the files are generated as the result of user interaction, the number of files being generated may either be too numerous or be generated too quickly to expect a user to name them all.

Some systems employ a centralized catalog system to index and track electronic files maintained on a data storage medium within an electronic system. As the catalog system typically exercises exclusive control over the files within the system, the catalog system is often able to organize the file data in an efficient and easily accessible manner to allow quick retrieval of each file. However, scenarios exist in which the integrity of a centralized catalog system is difficult to maintain, such as where exclusive control of the file data or the data storage medium cannot be guaranteed. In other situations, maintaining such a catalog system may be overly burdensome or undesirable.

DETAILED DESCRIPTION

Figure 1:
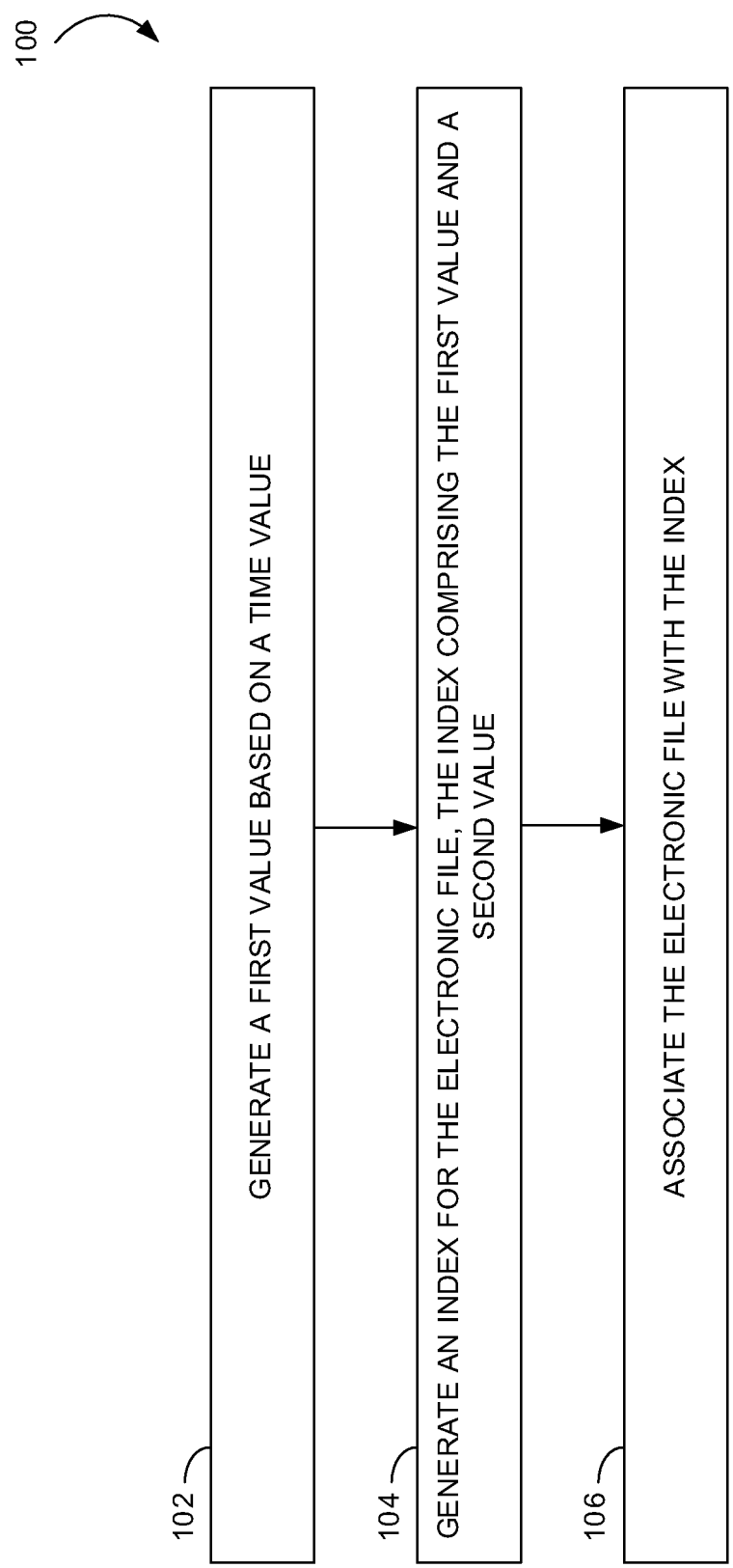
FIG. 1 is a flow diagram depicting a method for indexing an electronic file according to an embodiment of the invention.

FIG. 1 depicts a flow diagram of a method 100 for indexing an electronic file. The method 100 includes generating a first value based on a time value (operation 102). An index including the first value and a second value is generated (operation 104). The index is associated with the electronic file (operation 106). In another embodiment, a computer-readable medium is provided which includes instructions executable on a processor for employing the method 100.

Figure 2:
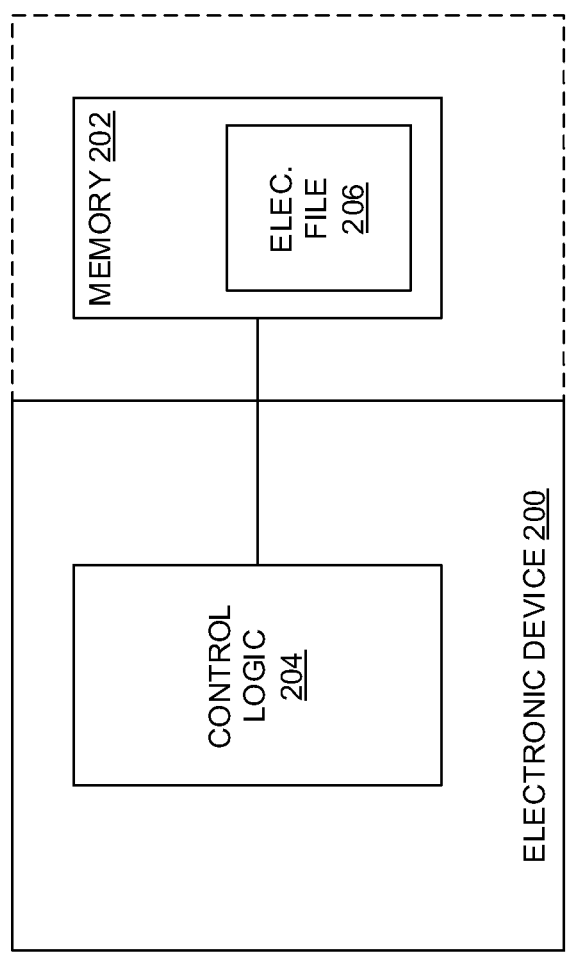
FIG. 2 is a block diagram of an electronic system according to an embodiment of the invention.

In FIG. 2, a block diagram of an electronic system 201 according to another embodiment is presented which includes an electronic device 200. The electronic system 201 includes a memory 202 configured to store an electronic file 206, wherein the memory 202 may be located within or external to the electronic device 200. Included in the electronic device 200 is control logic 204 coupled with the memory 202. The control logic 204 is configured to generate a first value comprising a timestamp, and to produce an index associated with the electronic file 206, wherein the index comprises the first value and a second value.

Figure 3:
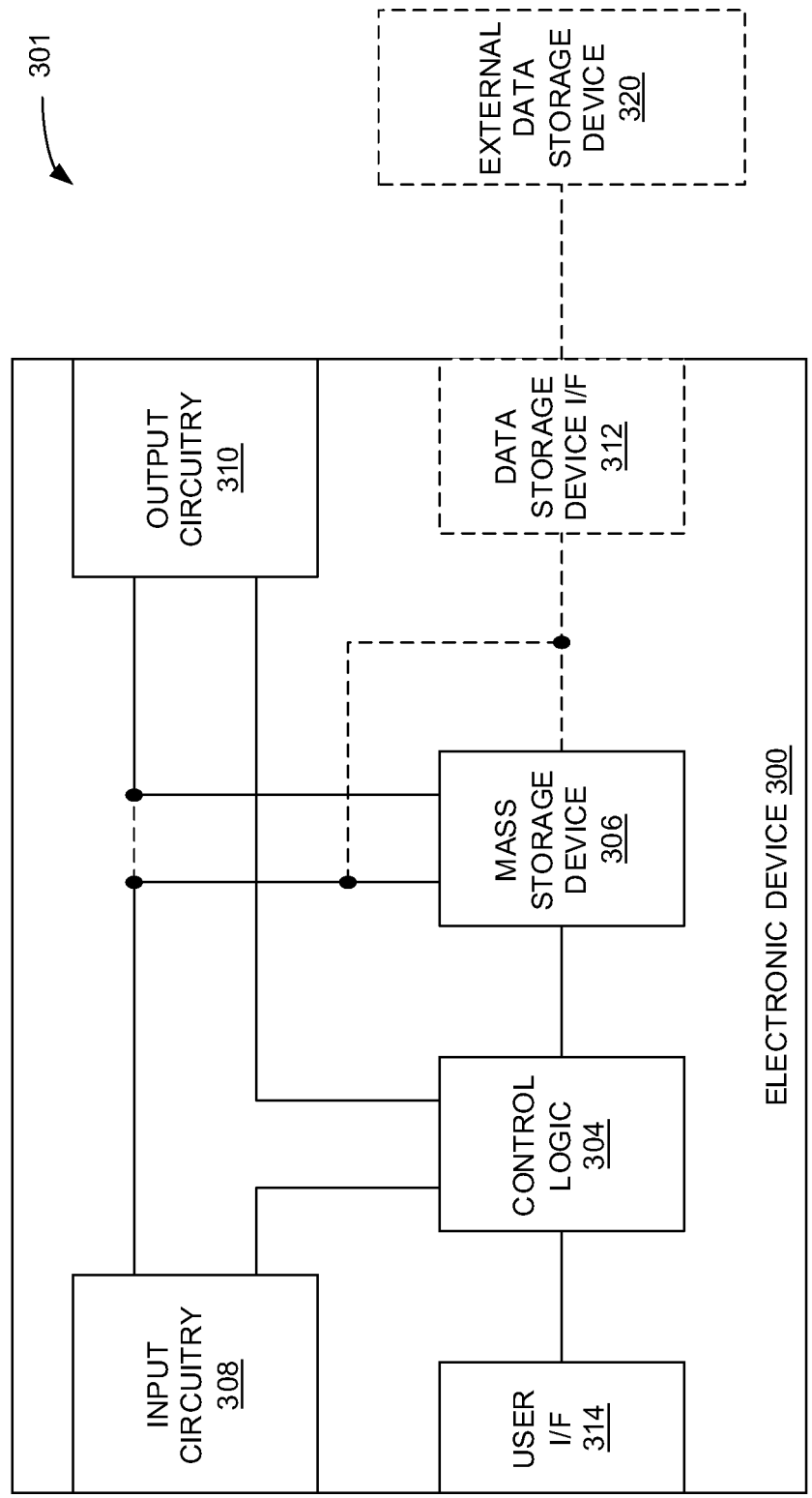
FIG. 3 is a block diagram of an electronic system according to another embodiment of the invention.

FIG. 3 provides another embodiment of an electronic system 301 including an electronic device 300 according to another embodiment. In one implementation, the electronic device 300 may be a broadcast programming receiver, such as a satellite or cable broadcast set-top box (STB). For example, the electronic device 300 may be a direct broadcast satellite (DBS) receiver or similar device capable of receiving audio and/or video programming, such as news programs, movies, sporting events, and many other types of programming. In another embodiment, the electronic device 300 may be a satellite radio receiver designed to receive audio from a variety of programming sources.

The electronic device 300 of FIG. 3 includes control logic 304 which may be a processor, such as a microprocessor or microcontroller, configured to execute software or firmware instructions for performing the operations described in greater detail below. In another embodiment, the control logic 304 may include electronic hardware, such as an application-specific integrated circuit (ASIC) or other digital logic, possibly combined with a processor.

Located within the system 301 and coupled with the control logic 304 may be a memory, such as a mass storage device 306, for storing electronic files. In one embodiment, an electronic file is a collection of digital data organized as a unit. In the case of a broadcast programming receiver, each electronic file may be a program or portion of a program recorded within the electronic device 300 for later retrieval and viewing by a user. In one implementation, the mass storage device 306 may be a hard disk drive, optical disk drive, tape drive, non-volatile semiconductor-based memory, or other means for storing the electronic files. In another example, other memory not shown in FIG. 3 may include random access memory (RAM) and read-only memory (ROM) for storing instructions, program data, and other information to be accessed and processed by the control logic 304

Possibly coupled with the control logic 304 is input circuitry 308 configured to receive broadcast programming from an external source, such as a satellite or a terrestrial cable, and to possibly transfer the programming to the mass storage device 306. The input circuit 308 may receive, for example, programming signals from a satellite antenna, cable input, or other input device (not shown in FIG. 3). The input circuit 308 may then demodulate and decode the programming before being stored in the mass storage device 306. In one implementation, the programming is stored as one or more electronic files on the mass storage device 306. For example, a user may employ a user interface 314 coupled with the control logic 304 to select one or more programs for recording so that the programs may be viewed at a later time. The user interface 314 may include, for example, remote control receiver circuitry that receives commands from a remote control device operated by the user to select the programming to be recorded.

The programming from the input circuitry 308 may also be transferred to output circuit 310. The output circuitry 310 may modulate or otherwise modify the programming, and output the programming for reception by a television, video monitor, radio, or other device (not shown in FIG. 3) by which a user may receive or otherwise use the programming. In one embodiment, at least some of the programming may be transferred directly from the input circuitry 308 to the output circuitry 310 without first being stored in the mass storage device 306. In another implementation, at least some of the programming may be stored temporarily in the mass storage device 306 before being transferred to the output circuitry 310 to allow the user to pause, rewind, or fast forward the recorded programming. In one example, the user may employ a remote control device and the user interface 314 to the control the viewing of a program in such a manner.

Also coupled with the mass storage device 306 of FIG. 3 may be a data storage device interface 312 configured to facilitate communication between the electronic device 300 and an external memory, such as an external data storage device 320. In one embodiment, the data storage device interface 312 may be any interface, such as a Universal Serial Bus (USB) or IEEE-1394 interface, capable of coupling the electronic device 300 with the external data storage device 320. In one embodiment, the external data storage device 320 may act as an external data archive for electronic files previously recorded onto the mass storage device 306 of the electronic device 300. For example, a user may employ the user interface 314 in conjunction with a remote control device to select one or more programs stored on the mass storage device 306 for archival on the external data storage device 320. In response, the control logic 304 may cause the selected program or electronic file to be retrieved from the mass storage device 306 and transferred to the external data storage device 320 by way of the data storage device interface 312. In another example, the control logic 304 may detect whether the collective size of the electronic files is approaching the storage capacity of the mass storage device 306. In response, the control logic 304 may transfer one or more of the electronic files to the external data storage device 320 via the data storage device interface 312, with or without the approval of the user. In another embodiment, the data from the input circuitry 308 may be forwarded directly to the external data storage device 320 through the data storage device interface 312 without first being stored on the mass storage device 306.

To distinguish one electronic file from another, the control logic 304 associates or labels each of the files with a unique index. In one example, the index may be a file name for an electronic file. Further, such a file name may or may not also include a file extension as part of the file name. In other embodiments, the index may be a file folder configured to refer to one or more electronic files. In the discussion below, indexes are generally presumed to be associated directly with the electronic files themselves.

Generally, the index may be any data associated with or stored with an electronic file or file folder, and used to identify the file or folder. For example, the index may be stored in a file header that is attached to the file. The index may be generated in conjunction with the creation of the electronic file to be indexed. In another embodiment, the index may be generated in conjunction with the electronic file being stored on the internal mass storage device 306 or transferred to the external data storage device 320. In another implementation, the type of data forming the index may be numerical, alphabetical, or some other data type, or some combination thereof.

Figure 4:
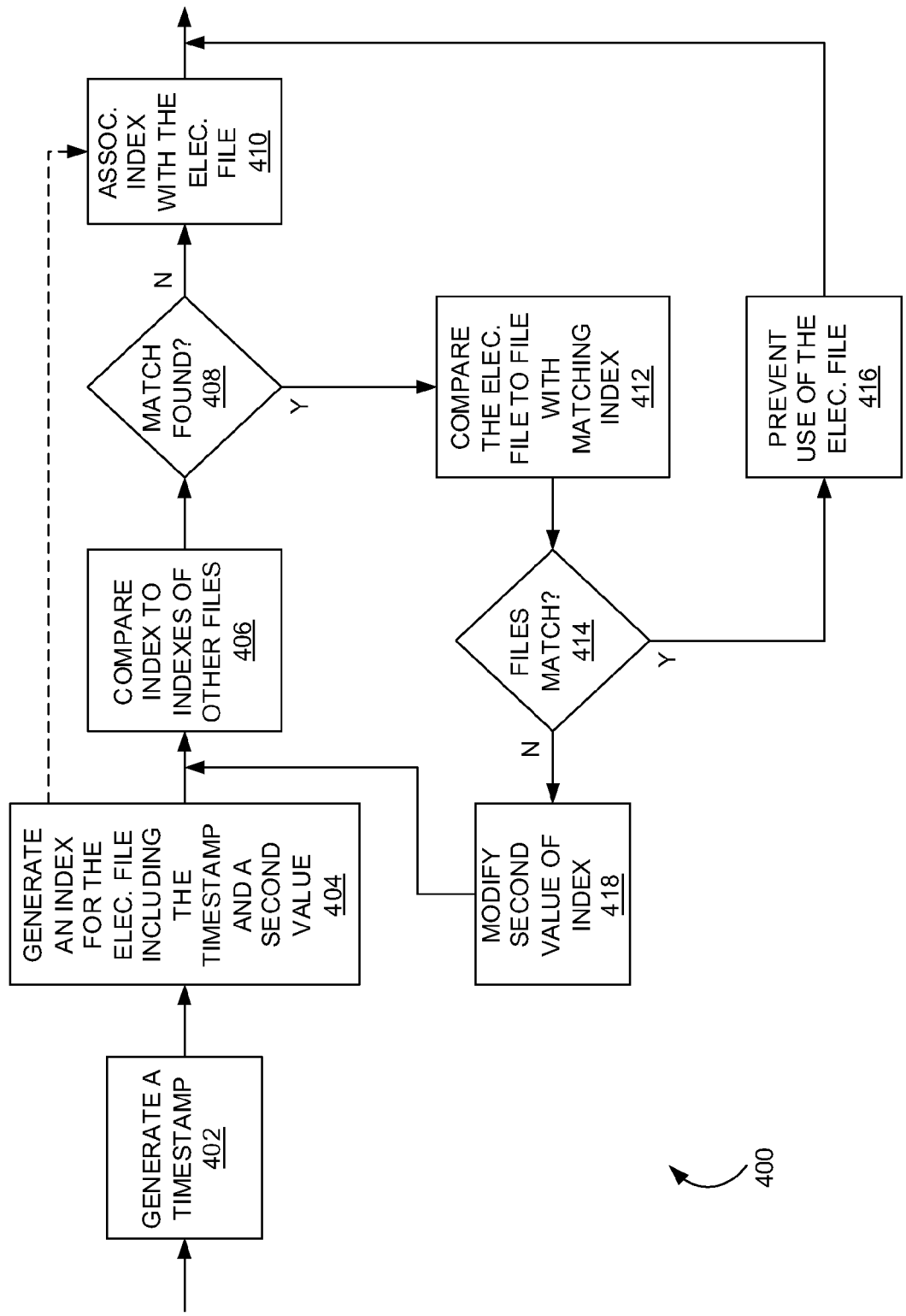
FIG. 4 is a flow diagram illustrating a method for indexing an electronic file according to another embodiment of the invention.

FIG. 4 presents a flow diagram of one possible method employed by the control logic 304 to index an electronic file. First, the control logic 304 generates a timestamp or other value indicating a point in time (operation 402). For example, the timestamp may indicate the date and time at the moment the timestamp is generated. In another implementation, the timestamp may indicate the date and time at which the associated electronic file is created, when the file is stored on the mass storage device 302, or when the file is transferred to the external data storage device 320. The timestamp may be generated from an internal clock maintained within the electronic device 300, or may be received from some external source. Further, the timestamp may exhibit a resolution of minutes, seconds, or some other increment of time, depending on the particular environment. Also, the timestamp may be an integer or other numeric value that reflects a particular date and time. For example, the timestamp may indicate a number of minutes or seconds elapsed from a predetermined reference point in time. In another implementation, the timestamp may include separate date and time portions.

The control logic 304 then generates an index which includes the time stamp and a second value (operation 404). In one embodiment, the second value is appended to the timestamp. In other examples, the second value may be located anywhere within the index. The second value may be an integer or other numeric value, an alphabetic character, or other data type. In another implementation, a combination of the timestamp and the second value may yield a single integer or other numeric value. For example, the second value may be initialized to a particular predetermined integer, such as a zero or one. Assuming the second value is appended to the timestamp, an example index may be represented as [timestamp]: [0].

The size of the second value may be designed to acquire a number of different values greater than a maximum number of electronic files expected to be associated with the same timestamp. For example, if the electronic device 300 is presumed to be a satellite set-top box with digital video recorder (DVR) capability, a second value of four bits, thus allowing sixteen different values for the second value, may be sufficient. More specifically, the possibility of having more than sixteen different electronic files containing recordings of programs with the same timestamp (i.e., within the same minute or second) is likely minimal. Depending on the rapidity with which electronic files are generated, as well as the resolution of the timestamp, more or fewer bits may be employed for the second value in a particular application.

After the index for the electronic file is generated, the index may be compared with the index associated with each of a number of preexisting electronic files (operation 406), such as those that may already be stored on the mass storage device 306 or the external data storage device 320. This comparison may be made to determine if a conflict exists between indexes of different electronic files, thus making access to either or both of the conflicting files difficult. If a match is not found between the generated index for the first electronic file and the index of one of the other electronic files (operation 408), the generated index is associated with the first electronic file (operation 410), such as by naming the file with the index, storing the index in header information co-located with the file, relating the index with the file in a data table, or other means.

If, instead, a match is found between the index for the first electronic file and the index of one of the other electronic files (operation 408), the first electronic file is compared with the electronic file associated with the matching index (operation 412). In one embodiment, the two files are compared to each other by comparing one or more data items in the header information associated with the files. Examples of the header information may include, for example, a recording or program name, a file identification number, a content description, a file length, and a file checksum or error correction code. One or more of these items or fields of the files may be compared to determine if the two files are indeed the same. In another implementation, the actual or "payload" data of the electronic files, such as the data which constitutes the video and audio information of a recorded broadcast program, may be compared to determine if the electronic files match. If the two electronic files match, the control logic 304 may determine as a result that the files are the same file, such as two recordings of the same broadcast program. As a result, the control logic 304 may prevent use of one of the two matching files to avoid having two identical files being stored on the mass storage device 306 or the external data storage device 320 (operation 416), which may waste valuable storage space and create confusion as to the content of the matching files. In one embodiment, if both files have already been stored on the mass storage device 306 or the external data storage device 320, one of the files may be deleted. If only one of the files has been stored, the duplicate file may be prevented from being stored on the associated storage device 306, 320.

If the two files do not match (operation 414), the files are determined to be different, and thus should be associated with different indexes. To that end, the control logic 304 may modify the second value of the index for the first electronic file to distinguish that index with the index of the matching file (operation 418). In one embodiment, the second value may be incremented or decremented by one to sufficiently alter the second value. For example, presuming an initial index of [timestamp]:[0], incrementing the second value would yield a modified index of [timestamp]:[1]. After the modification, the method 400 returns to the operation of comparing the indexes of the first electronic file with the other available electronic files (operation 406). The process then continues until no match between indexes is found (operation 408), at which point the generated index is associated with the first electronic file (operation 410), or until use of either the first electronic file or a matching file is prevented (operation 416).

As shown via dotted line in FIG. 4 from the generation of the index (operation 404) to the association of the index with the file (operation 410), the index may be of sufficient uniqueness that comparing the generated index with indexes of other files may be unnecessary. In one implementation, instead of generating an initial zero or one for the second value for every index, as described above, a hashing function may be applied to description information associated with the file, such as any of the file header information described above, to generate the second value. One example of a possible hashing function employable in this example is the Secure Hash Algorithm 1 (SHA-1) often utilized in cryptographic applications, such as the Pretty Good Privacy (PGP) security application. Use of a hashing function may reduce the possibility of generating two identical indexes to an insignificant level, thus eliminating the need to compare the generated index to those of other files.

Various embodiments of the invention, as described above, may eliminate the need of the centralized catalog system described earlier to index a number of electronic files. Indexing electronic files or file folders as described herein does not require a centralized catalog to maintain the individual identity of the stored files, as a unique index is generated each time a new file is added, thus relieving the system of any processing of previous files or their indexes. Also, corruption of one file typically does not adversely affect the viability of the remaining files, thus enhancing the overall data security of the system. This security is particularly beneficial in an environment in which the electronic files are stored on an external data storage device, since a catalog system may not have exclusive control over the files in question. Further, devices which may be coupled with multiple external data storage devices further complicate the use of a catalog system, while such a system presents little if any additional difficulties for the index systems and methods discussed herein. Also, the embodiments discussed herein typically involve computations of minimal complexity to generate the unique index names and to detect index collisions, as discussed above.

Use of at least some of the embodiments described herein also allow a simplified presentation of the archive index, such as by way of a television coupled with the output circuitry 310 of the electronic device 300 of FIG. 3. For example, a presentation of the files in order of their creation may involve sorting a listing of the files according to their indexes in increasing or decreasing order. Accordingly, searching for a particular file may merely involve a search of the sorted list using any of a number of simple searching techniques, such as a binary search.

While several embodiments of the invention have been discussed herein, other embodiments encompassed by the scope of the invention are possible. For example, while embodiments of the invention have been described in connection with satellite broadcast and cable television STBs, such as those normally associated with video and audio programming, other electronic devices, such as general-use and special-purpose computer systems, compact disc (CD) players, digital versatile disc (DVD) players, Motion Picture Experts Group 1, Audio Layer 3 (MP3) players, and other electronic devices in which a plurality of files may be generated or recorded, may benefit from application of the concepts described herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method for naming an electronic file in a file system, comprising:
   generating a first value based on a time value;
   generating a file name for a first electronic file, the file name comprising the first value and a second value;
   comparing the file name for the first electronic file to a file name for each of a plurality of second electronic files to thereby ensure that the first file name for the first electronic file is a unique file name within the file system;
   upon determining that the file name for the first electronic file is a unique file name, associating the first electronic file with the file name for the first electronic file for subsequent use in the file system, and otherwise
   comparing the first electronic file with one of the second electronic files that has a matching file name to thereby determine whether the first electronic file is a duplicate of the one of the second electronic files; and
   upon determining that the first electronic file is not a duplicate of the one of the second electronic files, modifying the second value of the file name for the first electronic file and returning to comparing the file name for the first electronic file with the file name for each of the second electronic files; and otherwise
   subsequently preventing use of at least one of the first electronic file and the one of the second electronic files in the file system.

2. The method of claim 1, wherein comparing the first electronic file with the one of the second electronic files comprises comparing file header information of the first electronic file with file header information of the one of the second electronic files.

3. The method of claim 1, wherein comparing the first electronic file with the one of the second electronic files comprises comparing at least some payload data within the first electronic file with corresponding data within the one of the second electronic files.

4. The method of claim 1, wherein modifying the second value of the file name of the first electronic file comprises incrementing the second value of the file name of the first electronic file.

5. The method of claim 1, further comprising sorting the first electronic file and the second electronic files in a list using the file system, wherein the list is sorted according to the file name of each of the electronic files.

6. The method of claim 1, further comprising searching for the first electronic file in the file system based on the file name of the first electronic file.

7. A computer-readable non-transitory medium comprising instructions executable on a processor for employing a method of naming an electronic file, the method comprising:
generating a first value based on a timestamp;
producing a file name for a first electronic file, the file name comprising the first value and a second value;
comparing the file name for the first electronic file to a file name for each of a plurality of second electronic files to thereby ensure that the file name for the first electronic file is a unique file name within the file system;
upon determining that the file name for the first electronic file is a unique file name, labeling the first electronic file with the file name for the first electronic file for subsequent use within the file system, and otherwise
comparing at least a portion of the first electronic file with a corresponding portion of the one of the second electronic files to thereby determine whether the first electronic file is a duplicate of the one of the second electronic files, and, upon determining that
the first electronic file is not a duplicate of the one of the second electronic files, modifying the second value of the file name for the first electronic file and returning to comparing the file name for the first electronic file with the file name for each of the second electronic file, and otherwise
preventing subsequent use of the first electronic file in the file system.

8. An electronic system, comprising:
a memory configured to store electronic files; and
control logic located within an electronic device of the electronic system and coupled with the memory to thereby implement a file system for the stored electronic files, wherein the control logic is configured to:
generate a first value comprising a timestamp;
produce a file name associated with a first electronic file to be stored in the memory, wherein the file name comprises the first value and a second value;
compare the file name associated with the first electronic file with a file name for each of a plurality of second electronic files stored in the memory to thereby ensure that the file name for the first electronic file is a unique file name within the file system;
upon determining that the file name associated with the first electronic file is a unique file name, label the first electronic file with the file name associated with the first electronic file in the file system, and store the first electronic file in the memory and otherwise
compare the first electronic file with the one of the second electronic files to thereby determine whether the first electronic file and the one of the second electronic files are duplicates of each other; and
upon determining that the first electronic file is not a duplicate of the one of the second electronic files, modify the second value of the file name associated with the first electronic file and return to the comparing of the file name associated with the first electronic file with the file name for each of the plurality of second electronic files, and
otherwise prevent storage of the first electronic file in the file system.

9. The electronic system of claim 8, wherein the electronic device further comprises:
input circuitry coupled with the control logic and configured to receive broadcast programming from at least one of a satellite and a terrestrial cable; and
output circuitry coupled with the control logic and the input circuitry and configured to output the broadcast programming from the electronic device.

10. The electronic system of claim 8, wherein the memory comprises an internal mass storage device located within the electronic device.

11. The electronic system of claim 8, wherein:
the memory comprises an external data storage device located external to the electronic device; and
the electronic device comprises a data storage device interface configured to facilitate communication between the electronic device and the external data storage device.

12. The electronic system of claim 11, wherein the electronic device further comprises:
a user interface coupled with the control logic and configured to receive a user input;
wherein the control logic is configured to store the first electronic file and the file name of the first electronic file on the external data storage device in response to the user input.

13. The electronic system of claim 8, wherein the control logic is configured to compare the first electronic file with the one of the second electronic files by comparing file header information of the first electronic file with file header information of the one of the second electronic files.

14. The electronic system of claim 8, wherein the control logic is configured to compare the first electronic file with the one of the second electronic files by comparing at least some of payload data within the first electronic file with corresponding data within the one of the second electronic files.

15. The electronic system of claim 8, wherein the control logic is configured to modify the second value of the file name associated with the first electronic file by incrementing the second value.

16. The electronic system of claim 8, wherein the first electronic file comprises one of an audio recording file, a video recording file, and an audio/video recording file.

17. The electronic system of claim 8, wherein the first electronic file comprises an electronic file folder configured to include other electronic files.

18. The electronic system of claim 8, wherein the file system is configured to subsequently access the first electronic file using the unique file name, but without using a centralized catalog of the electronic files.

19. The electronic system of claim 8, wherein the electronic system is a digital video recorder, and wherein the electronic files represent recorded television programming.

* * * * *